United States Patent [19]
Balatoni

[11] Patent Number: 5,668,814
[45] Date of Patent: Sep. 16, 1997

[54] DUAL DDS DATA MULTIPLEXER

[75] Inventor: Nicholas A. Balatoni, Santa Clara, Calif.

[73] Assignee: Raychem Corporation, Menlo Park, Calif.

[21] Appl. No.: 408,585

[22] Filed: Mar. 20, 1995

[51] Int. Cl.[6] .................................................... H04J 3/00
[52] U.S. Cl. ........................ 370/540; 375/288; 375/289; 379/93.06
[58] Field of Search ........................... 375/211, 214, 375/240, 241, 286, 288, 289; 370/37, 41, 43, 112, 118, 203, 297, 298, 300, 540; 379/90, 93, 94, 97, 108

[56] References Cited

U.S. PATENT DOCUMENTS

| 3,660,606 | 5/1972 | De Witt ................................ 370/80 |
| 3,711,650 | 1/1973 | Kuhn et al. ........................... 370/82 |
| 3,851,106 | 11/1974 | Jacobaeus ............................. 370/118 |
| 3,922,493 | 11/1975 | Brenig et al. ......................... 370/110.1 |

(List continued on next page.)

FOREIGN PATENT DOCUMENTS

| 0 087 265 | 8/1983 | European Pat. Off. . |
| 0 227 164 | 7/1987 | European Pat. Off. . |
| WO 85/02960 | 7/1985 | WIPO . |
| WO 95/01600 | 2/1991 | WIPO . |

OTHER PUBLICATIONS

Gerwin et al., "Dual digital tranmission system for multipair cables based on 'crank-shaft coding,'" (1984) *Electronic Letters*, 20(15):619–621.
Kaiser et al., "Digital Two–Wire Local Connection Providing Office Subscribers with Speech, Data and New Teleinformation Services," ISSLS, Mar. 20–24, 1978 pp. 126–130.
Kawakami et al., "Improved Subscriber Loop Multiplexing Systems for Rural Areas," *Japan Telecommunications Review*, Apr. 1978, pp. 125–132.

(List continued on next page.)

*Primary Examiner*—Benedict V. Safourek
*Attorney, Agent, or Firm*—Townsend and Townsend and Crew LLP

[57] ABSTRACT

A method and apparatus 200 for converting dual 4-wire digital data services (DDS-1 and DDS-2) for transmission over a single twisted pair telephone line 205. The present method includes use of a digital data service remote terminal 219 and a digital data service central office terminal 201. Each terminal converts more than one 4-wire digital data services into a 2B1Q signal for transmission over the single twisted pair telephone line 205. The present method provides an efficient and cost effective technique for increasing 4-wire digital data services to a customer premises without a corresponding increase in the number of telephone lines.

26 Claims, 4 Drawing Sheets

Microfiche Appendix Included
(1 Microfiche, 58 Pages)

U.S. PATENT DOCUMENTS

| | | | |
|---|---|---|---|
| 3,936,602 | 2/1976 | Korver | 178/58 R |
| 4,078,159 | 3/1978 | Lender et al. | 375/289 |
| 4,417,333 | 11/1983 | Cochennec | 370/66 |
| 4,519,073 | 5/1985 | Bertocci et al. | 370/118 |
| 4,578,538 | 3/1986 | Pascucci et al. | 179/2 DP |
| 4,642,805 | 2/1987 | Dumas et al. | 370/58 |
| 4,740,963 | 4/1988 | Eckley | 370/110.1 |
| 4,745,624 | 5/1988 | Mantovani et al. | 375/289 |
| 4,755,994 | 7/1988 | Staples et al. | 370/118 |
| 4,788,680 | 11/1988 | Kikuchi et al. | 370/68 |
| 4,901,344 | 2/1990 | Monette et al. | 379/93 |
| 4,924,492 | 5/1990 | Gitlin et al. | 379/93 |
| 5,040,190 | 8/1991 | Smith et al. | 375/214 |
| 5,111,497 | 5/1992 | Bliven et al. | 379/27 |
| 5,160,929 | 11/1992 | Costello | 341/57 |
| 5,303,267 | 4/1994 | Gupta | 375/38 |
| 5,453,989 | 9/1995 | Kitayama et al. | 370/110.1 |
| 5,459,729 | 10/1995 | Bliven | 370/112 |
| 5,459,730 | 10/1995 | Bliven | 370/112 |
| 5,473,613 | 12/1995 | Bliven | 370/112 |

OTHER PUBLICATIONS

Siemens, *Telecommunications Data Book 1987*, pp. 5–20 to 5–21.

Bellamy, *Digital Telephony*, Chapter 1 and 2, John Wiley & Sons, 1982, pp. 1–82.

Optilink Corporation, "PAIRSPAN–2 Digital Subscriber Carrier System Product Line Description," Jul. 20, 1989 12 pages.

Optilink Corporation, "Pairspan–2 Two–Line Digital Carrier System," 1989 4 pages.

Pacific Bell Request for Quote, Jun. 14, 1989 54 pages.

Bell Atlantic Network Services, Inc. RFQ#90BGP0018 55 pages.

Letter from David Bliven to Nynex Material Enterprises, Jan. 23, 1989 (with Request For Quote) 38 pages.

"Leading Edge Access," *Eastern Communications Forum 88*, May 2–4, 1988, Rye Brook, New York 2 pages.

Advertising materials for "DuaLine System" (1990) Rockwell International 6 pages.

Advertising materials for "DigiLoop" (Undated) ECI Telecom 5 pages.

Advertising materials for "DAML–100" (Undated) Wheelock, Inc. 2 pages.

Advertising materials for "Pairgain2 Digital Pair Saver" (Undated) PairGain Technologies, Inc. 4 pages.

Siemens, *ISDN Communication Controller (ICC) PEB 2070 Data Sheet, Rev. 3.0* (Jul. 1988) pp. 1.3–5.2.

ANSI, *Integrated Services Digital Network (ISDN) Basic Access Interface for Use on Metallic Loops for Application on the Network Side of the NT* (1988) pp. 15–77.

"Requirements and Objectives for Digital Added Main Line (DAML)," Pacific Bell PUB L–780057–B/NB, Issue 1, May 1989 pp. i–iii and 1–1 to 9–3.

DUAL DDS DATA MULTIPLEXER

CROSS-REFERENCES

This application is related to PCT International Publication Number WO 91/01600, published Feb. 7, 1991, and to U.S. Pat. No. 5,111,497 issued on May 5, 1992 to Bliven et al., both of which are completely incorporated herein by reference for all purposes. This application is also related to application Ser. No. 08/408,020 and to application Ser. No. 08/408,610, now U.S. Pat. No. 5,610,922 both filed on the same day as the present application.

MICROFICHE APPENDIX

This application includes a microfiche of Appendices I, II, III, IV, V and VI, having one sheet totaling 58 frames.

COPYRIGHT NOTICE

A portion of the disclosure of this patent document contains material which is subject to copyright protection. The copyright owner has no objections to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to the field of data communications. Merely by way of example, the present invention is illustrated as a method and related apparatus for converting dual 4-wire digital data services for transmission over a single twisted pair telephone line.

Techniques for the transmission of multiple voice or data signals over a 4-wire loop are well known in the telecommunications industry. Conventional digital data services (DDS) over a 4-wire local loop include digital services at transmission rates of 2.4 kilo-bits/sec. (kbps), 4.8 kbps, 9.6 kbps, 19.2 kbps, and 56 kbps. Business subscribers often rely upon the conventional DDSs for use with electronic data processing equipment such as telephones, computers, facsimile machines, and the like. As the subscribers increase their use of such electronic data processing equipment, the need for DDSs also increases accordingly. However, it often is difficult, costly, and time consuming to add an additional 4-wire local loop onto a customer premises, thereby making it difficult to increase the amount of data communication services.

For example, the conventional DDS often needs to transmit digital data over "clean" telephone lines, that is, telephone lines that substantially have no abrupt changes in impedance values from wire gauge changes, bridge taps, coils, and the like. In particular, telephone companies often find it necessary to condition pre-existing telephone lines to remove such wire gauge changes, bridge taps, coils, and the like before implementing the conventional DDS onto the pre-existing telephone lines. In fact, telephone companies refer to this type of conditioning as a class C3 data conditioning technique. The C3 data conditioning technique often takes up to two weeks or even more for a typical 10–12 kilo-feet 4-wire local loop.

Another limitation with the use of the conventional 4-wire DDS is the need for repeaters when the loop exceeds 10–12 kilo-feet. Some telephone companies even install a repeater at the customer premises if signal losses fall below a pre-determined sound level such as 32 dBs using 28 kHz, 48 kHz, and 80 kHz test signals. The use of the repeater at the customer premises occurs because certain data service unit/channel service units (DSU/CSU) operate ineffectively at low signal levels. The conventional DDS relies upon a typical bipolar signal at a transmission rate of up to 56 kbps which often cannot flow effectively over a line span of 10–12 kilo-feet without the use of a repeater. The use of such repeater increases the cost of the conventional DDS for transmission lengths greater than 10–12 kilo-feet, and also decreases the efficiency and reliability of the conventional DDS by introducing additional elements into the telephone line span.

Still further, the conventional 4-wire DDS service requires the use of four wires, typically two twisted pair lines. Accordingly, it is often difficult, time consuming, and labor intensive to, for example, temporarily relocate equipment such as video tele-conference equipment and the like from location to location due to the limited availability of the two twisted pair lines at a typical customer premises. In addition, the use of two twisted pair lines for providing conventional DDS is generally an inefficient deployment of copper, which is a limited telephone company resource.

From the above, it is seen that a method and apparatus for providing an increase in data services from a telephone company central office to a customer premises over pre-existing wires is often desired.

SUMMARY OF THE INVENTION

According to the present invention, a method and apparatus is provided to convert dual 4-wire DDSs into multiplexed digital signals for transmission over a single twisted pair telephone line. The present invention provides an easy to install remote terminal and central office terminal to convert a single twisted pair telephone line for transmission of 2B1Q signals representing a plurality of conventional 4-wire DDS signals.

In a specific embodiment, the present invention provides a method of transferring digital data over a single twisted pair from a telephone company location. The present method includes steps of providing a plurality of 4-wire DDS signals from a channel bank at a telephone company location. Each of the plurality of 4-wire DDS signals is a bipolar signal. The present method also includes combining the plurality of 4-wire DDS signals into a binary signal, and converting the binary signal into a digital signal in a 2B1Q (or 4B3T) format. A step of transferring the digital signal at the 2B1Q (or 4B3T) format over a single twisted pair telephone line for use at a customer premises is also included.

An alternative specific embodiment provides an apparatus for transferring digital data over a single twisted pair from a telephone company location. The present apparatus includes a plurality of 4-wire DDS signals sources from a channel bank at a telephone company location, each of the plurality of 4-wire DDS signals being a bipolar signal. A central office circuit combining the plurality of k-wire DDS signals into a binary signal, converting the binary signal into a digital signal in a 2B1Q (or 4B3T) format, and transferring the digital signal at the 2B1Q (or 4B3T) format over a single twisted pair telephone line for use at a customer premises is also included.

A further alternative embodiment provides a method for converting a single twisted pair telephone line into use with a multiplexed plurality of 4-wire DDS signals. The present method includes installing at a telephone company location a central office terminal. The present central office terminal includes a plurality of 4-wire DDS signals sources from a channel bank at telephone company equipment, each of the plurality of 4-wire DDS signals being a bipolar signal. A central office circuit combining the plurality of 4-wire DDS signals into a binary signal, converting the binary signal into a digital signal in a 2B1Q (or 4B3T) format, and transferring the digital signal at the 2B1Q (or 4B3T) format over a single twisted pair telephone line for use at a customer premises is also included in the central office circuit. The present method also includes installing at the customer premises location a remote terminal. The present remote terminal includes a plurality of 4-wire DDS signals sources from a plurality of data terminal equipment, each of the plurality of 4-wire DDS signals being a bipolar signal. The present remote terminal also includes a remote terminal circuit combining the plurality of 4-wire DDS signals into a binary signal, converting the binary signal into a digital signal in a 2B1Q (or 4B3T) format, and transferring the digital signal at the 2B1Q (or 4B3T) format over a single twisted pair telephone line for use at the telephone company equipment.

A further understanding of the nature and advantages of the present invention may be realized by reference to the latter portions of the specification and attached drawings.

DESCRIPTION OF THE SPECIFIC EMBODIMENT

Conventional 4-Wire DDS

Figure 1:
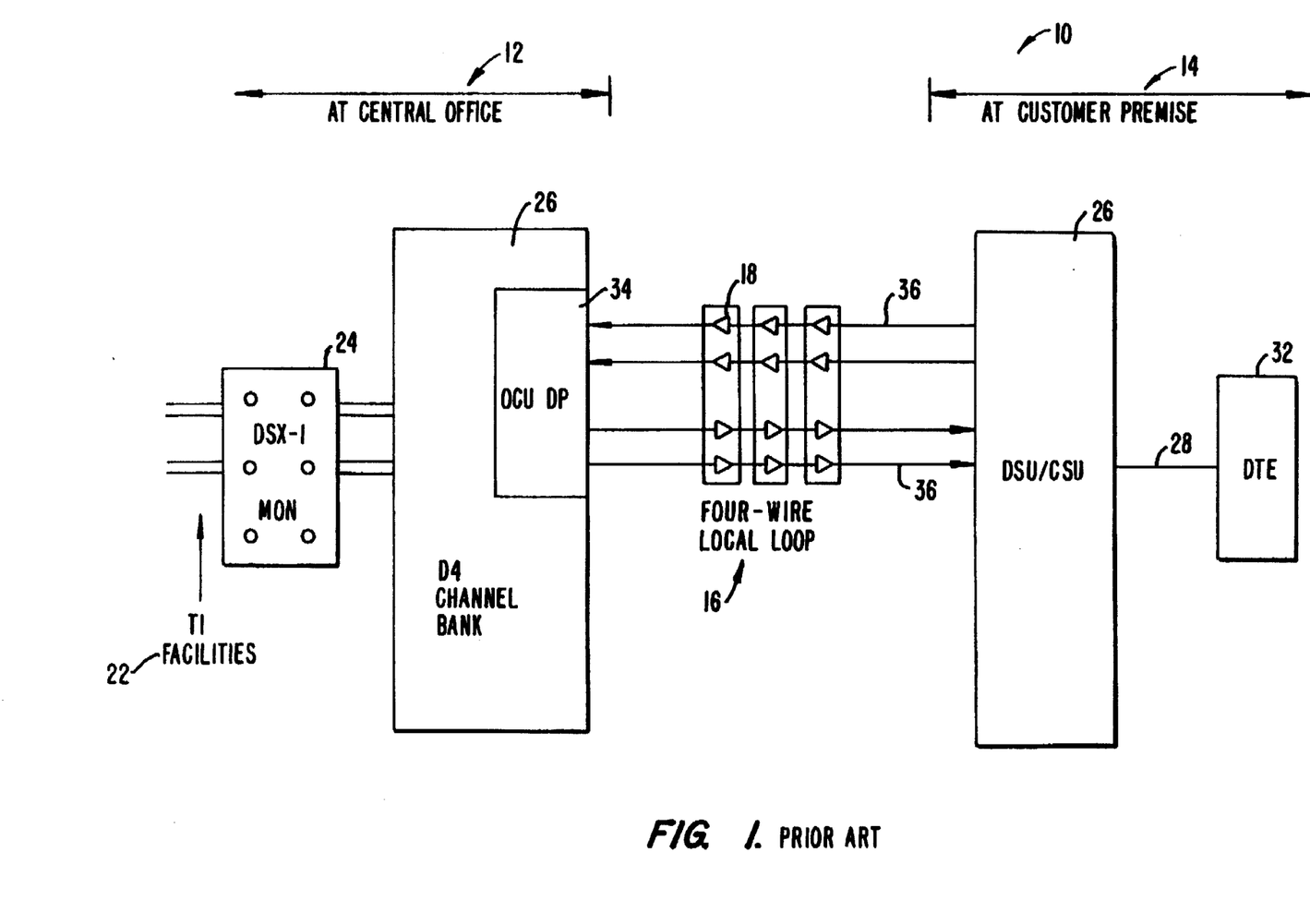
FIG. 1 is a simplified block diagram for a conventional 4-wire DDS circuit over a local loop between a central office and a customer premises.

FIG. 1 is a block diagram for a conventional 4-wire DDS circuit 10 deployed over a local loop between a central office 12 and a customer premises 14. Between the central office 12 and the customer premises 14 is a 4-wire local loop 16, typically with repeaters 18 based upon the loop length. At the central office 12, the conventional 4-wire DDS includes a connection to T1 facilities 22, a digital switch (or cross-connect) 24, and a channel bank 26. The customer premises includes system elements such as a data service unit/channel service unit (DSU/CSU) 26, a line interface 28, and a data terminal equipment (DTE) 32.

The central office receives the T1 transmission from a T1 carrier. The T1 carrier provides a DS-1 signal using 24 DS0 signals at a combined signal rate of 1.544 Mbps. The DS0 signal is the basic data channel encoded via pulse code modulation (PCM) and corresponds to a single DS0 channel at a signalling rate of 64 kbps. The DS-1 signal carries 24 DS0 channels, or a resultant group of multiplexing 24-eight-bit words, one from each line input to a channel bank. The resulting group of 24 PCM words is known as a frame. A single framing bit is inserted by use of time division multiplexing (TDM) to separate each frame from the next frame. The resultant frame has 193 bits and represents 24 voice or data digitized conversions with the one framing bit.

In North America, a conventional channel bank generally contains 24 channels, and a conventional channel bank in Europe generally contains 30 channels. The channel bank can also include a multiplicity of office channel unit/data ports (OCU/DPs) 34 to provide data signals to the 4-wire local loops. A conventional channel bank can be a D4 channel bank 26.

The D4 channel bank 26 combines 12 basic frames into a super-frame. The framing bits are often altered by the transmitting multiplexer to enable the receiving multiplexer to maintain synchronization. The composition of framing bits within the super-frame forms a distinct pattern. The framing sequence, in which the 12-bit frame pattern continuously repeats itself, is called D4 framing. The odd-numbered frames alternate the sequence 1010 . . . , while the even numbered frames alternate the sequence 000111 . . . . Alternatively, the conventional channel bank is a subscriber loop carrier (SLC) for 96 channel which can represent 96 telephone lines. The SLC for 96 channels is known as the SLC-96 channel bank. The SLC-96 channel bank can also adapt to DDS circuits byway of OCU/DP plug-ins. An example of the SLC-96 channel bank is described in, for example, application Ser. No. 08/408,020 filed on the same day as the present application.

The 4-wire local loop 16 is defined as two twisted pairs 36, each representing two wires. The 4-wire local loop also includes repeaters 18 based upon the loop length. The repeaters are often placed onto the 4-wire local loop about every 10–12 feet of line span to regenerate the bipolar digital pulses. The number of repeaters placed on to the 4-wire local loop depends upon the total line span or length.

At the customer premises, the conventional 4-wire DDS includes the DSU/CSU 26, the line interface 28, and the data terminal equipment (DTE) 32. The DSU performs the conversion of data from a unipolar data format into a bipolar data format for transmission over the 4-wire local loop. Alternatively, the DSU performs the data conversion from the bipolar data format into the unipolar data format for use at the data terminal equipment. The CSU terminates the digital circuit at the customer premises (or any end user's premises) and performs functions such as line conditioning, remote loopback testing, signal regeneration, and monitoring of the incoming digital signal to detect violations of rules governing the transmission of data on the 4-wire digital facility. The combined DSU/CSU generally converts the bipolar data format from the 4-wire local loop into a format such as RS-232C or V.35 for use at the data terminal equipment. The DSU/CSU also converts the signal from the data terminal equipment into the bipolar data format for use on the 4-wire digital facility.

As previously noted, the conventional 4-wire DDS system inherently possesses a variety of limitations. The limitations include the use of four wires, the need to condition pre-existing wires before 4-wire DDS use, the use of repeaters, and the like. The present invention resolves the aforementioned limitations byway of a dual 4-wire DDS method and apparatus illustrated by FIGS. 2–5.

Present Dual 4-Wire DDS System Hardware

In a specific embodiment, the present dual 4-wire DDS delivers two 4-wire DDS circuits from a telephone company central office to a customer premises such as a business or the like over a single twisted pair telephone line. The specific embodiment provides a 4-to-1 pair gain and leads to better efficiency in the deployment of copper and the like. It should be noted that the present invention is not limited by the dual 4-wire DDS embodiments, one of ordinary skill in the art will easily recognize other practical implementations of the invention described herein. Accordingly, the claims of the present invention will not be limited to the embodiments as described herein.

Figure 2:
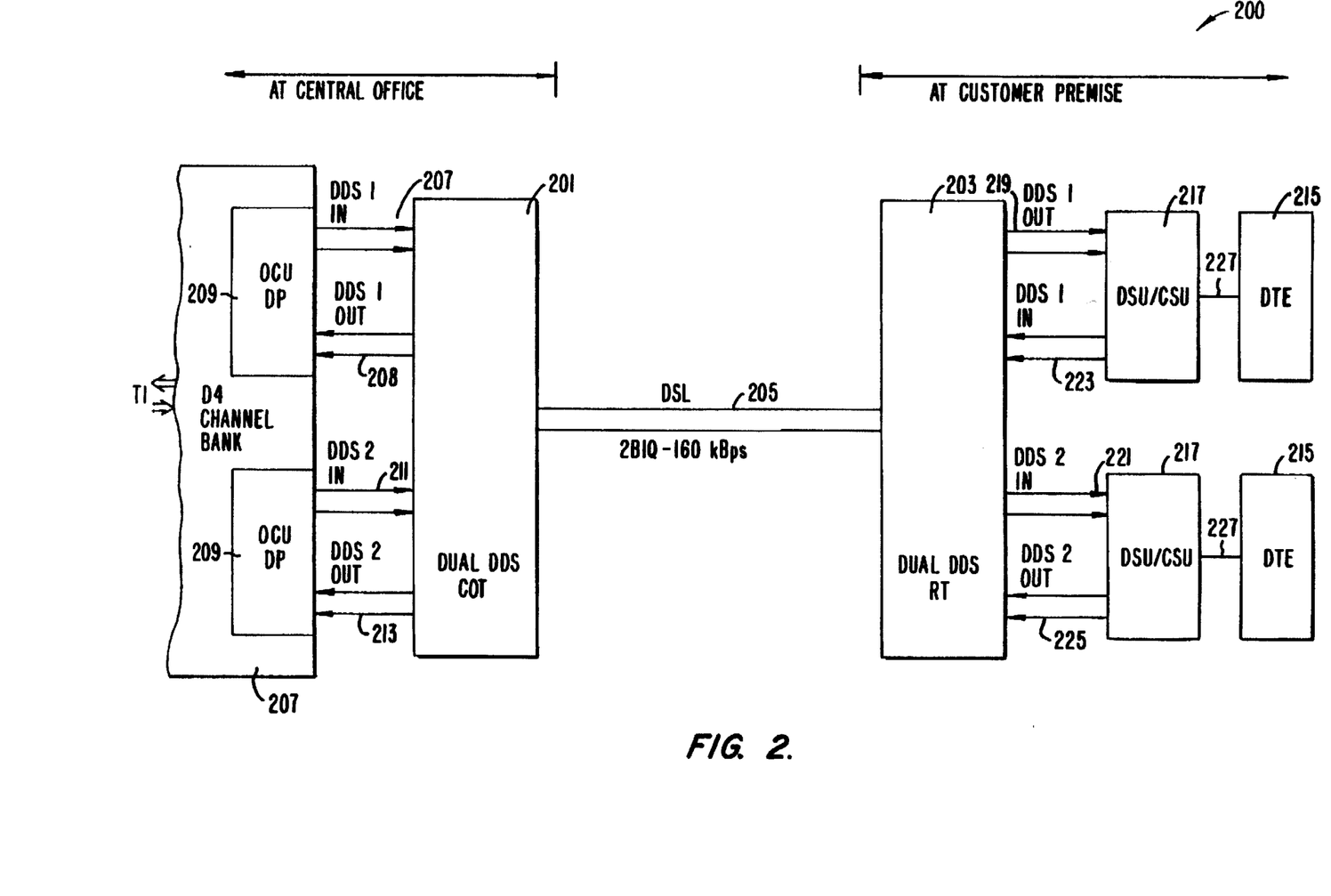
FIG. 2 is a simplified block diagram for a dual 4-wire DDS according to the present invention.

FIG. 2 is a simplified block diagram for a dual 4-wire DDS 200 according to the present invention. The dual 4-wire DDS 200 includes a digital data service central office terminal (DDS COT) 201 at a central office (CO) location and a digital data service remote terminal (DDS RT) 203 at a customer premises. Between the central office location and the customer premises is a 2-wire loop (or digital subscriber line) 205, which is the single twisted pair telephone line. The 2-wire loop transmits digital data through the single twisted pair at 160 kbps using a 2B1Q data format, without the use of repeaters for up to e.g., a 18 kilo-feet line span. Alternatively, the 2-wire local loop transmits a digital signal in a 4B3T format, as well as others.

At the central office, a T1 carrier terminates at a channel bank 207. The channel bank 207 is a D4 channel bank which combines 12 basic frames (and frame information) of 193 bits into a super-frame. The D4 channel bank includes a plurality of office channel unit/data port (OCU/DP) units 209, each receiving and transmitting a respective 4-wire digital data service between the DDS COT 201 and the T1 carrier. Alternatively, the channel bank can be a SLC-96 channel bank, or any other channel bank that provides the 4-wire digital data service. Of course, the type of channel bank used depends upon the particular application.

The DDS COT 201 converts two 4-wire DDS (DDS-1 and DDS-2) signals from the D4 channel bank 207 into a 2B1Q signal at 160 kbps for transmission over a digital subscriber line (DSL). As previously noted, the 4-wire DDS corresponds to the transmission of a bipolar signal at signalling rates of either 2.4 kbps, 4.8 kbps, 9.6 kbps, 19.2 kbps, 56 kbps, and even 64 kbps. It should be noted that DDS-1 and DDS-2 may correspond to either the same signalling rate or different signalling rates depending upon the particular application. The DDS COT receives a 4-wire DDS represented as DDS-1 from the D4 channel bank through lines 207. The DDS COT converts a DDS-1 signal into a portion of the 2B1Q signal for transmission over the digital subscriber line.

The DDS COT 201 also converts the 2B1Q signal from the digital subscriber line into a pair of 4-wire DDS signals for transmission to the D4 channel bank. The DDS COT receives the 2B1Q signal from the digital subscriber line, and converts a portion of the 2B1Q signal into the DDS-1 signal for transmission to the D4 channel bank. The DDS COT transmits the DDS-1 signal to the OSU/DP through lines 208. Similar functions are also carried out by the DDS COT for a DDS-2 signal through lines 211 and 213. Accordingly, the DDS COT provides two 4-wire DDS signals for transmission/reception over a single twisted pair, thereby providing a 4-to-1 pair gain.

At the customer premises, the DDS RT 203 receives and transmits the 2B1Q signals via the digital subscriber line 205 for use at data terminal equipment (DTE) 215. The DDS RT receives the 2B1Q signal from the digital subscriber line and converts such signal into two 4-wire DDSs, corresponding to DDS-1 and DDS-2. The DDS RT transmits the DDS-1 and the DDS-2 signals into respective data service unit/ channel service units DSU/CSUs 217 via lines represented as 219 and 221, respectively. Each DSU/CSU converts its 4-wire DDS signal into a usable format such as V.35, RS-232C, and the like 227 for use at the data terminal equipment. The DDS RT also receives the two 4-wire signals from the data terminal equipment via the respective DSU/ CSUs byway of lines represented as 223 and 225, respectively. The two 4-wire DDS signals from the DSU/CSUs are converted into the 2B1Q signal for transmission through the digital subscriber line.

The data terminal equipment includes devices such as telephones, personal computers, data terminals, thermostats, mainframe computers, point-of-sale systems, and others. The particular data terminal equipment can send and receive data signals for voice, video, data, and the like. The data terminal equipment may be almost any type of equipment for use in for example a business type setting. Of course, the type of data terminal equipment depends upon the particular application.

Figure 3:
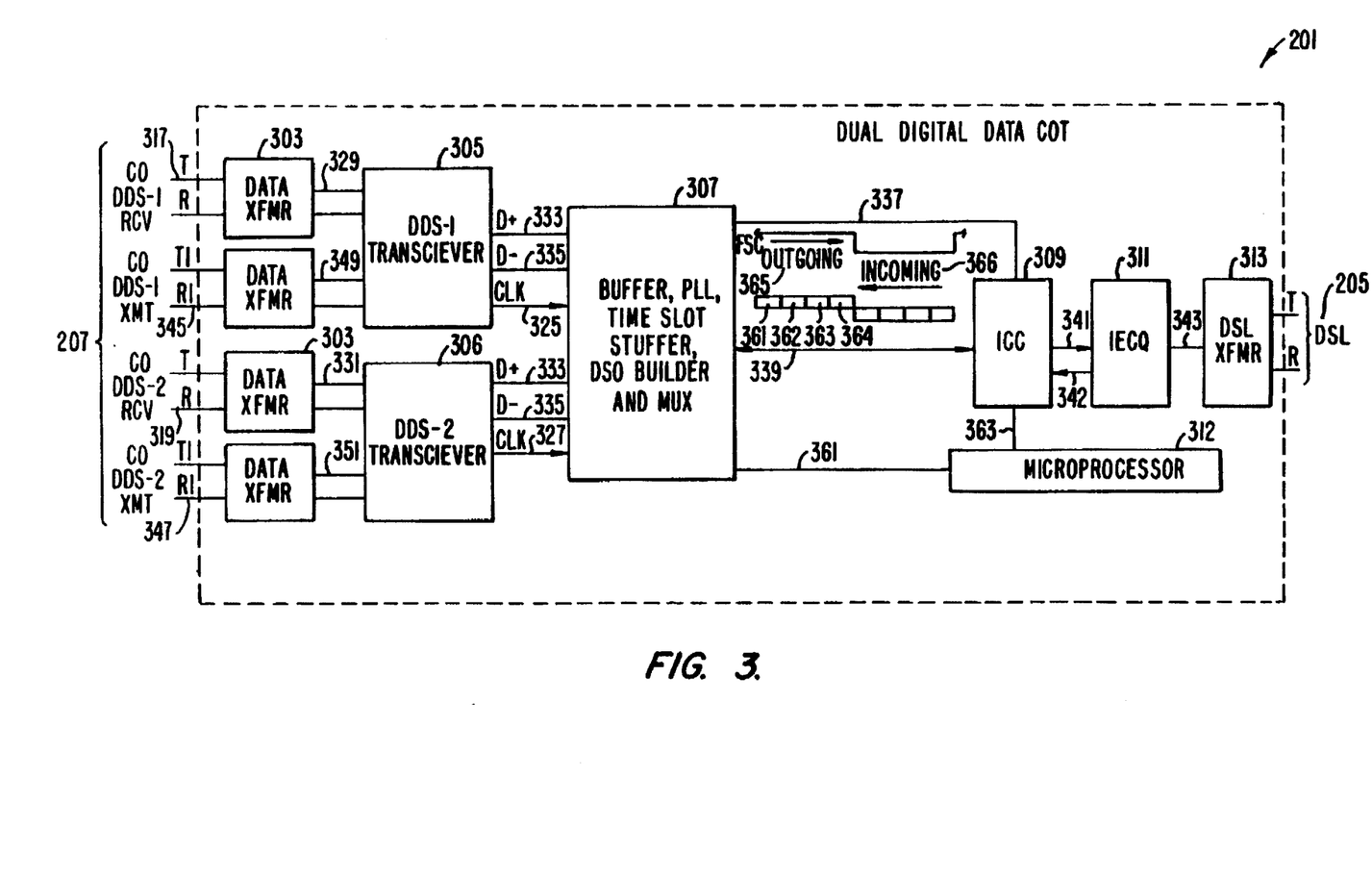
FIG. 3 is a simplified block diagram for a central office terminal according to the present invention.

FIG. 3 illustrates a simplified block diagram of the DDS COT 201 according to the present invention. The DDS COT 201 is placed in a local switching location, a central office, or other telephone company equipment facility at the terminus of a digital subscriber line from a business, an office or the like. The DDS COT 201 is coupled to two 4-wire digital data service lines 317, 345, 319, and 347 from the channel bank 207. The two 4-wire digital data service lines are defined as DDS-1 Rcv and DDS-1 Xmt for DDS-1, and DDS-2 Rcv and DDS-2 Xmt for DDS-2. The DDS COT includes data transformers (Data Xfmr(s)) 303, digital data service (DDS) transceivers 305, 306, a custom integrated circuit chip 307, an ISDN communications controller (ICC) integrated circuit chip 309, an ISDN echo cancellation-quaternary (IECQ) integrated circuit chip 311, a microprocessor 312, a digital subscriber line transformer (DSL Xfmr) 313, and other elements. The output/input to/from the subscriber line is provided via tip (T) and ring (R) lines or twisted pair 205.

From the channel bank, two outgoing 4-wire DDS signals enter the DDS COT where the two 4-wire DDS signals are defined as CO DDS-1 Rcv and CO DDS-2 Rcv. The two outgoing signals from the channel bank pass through lines 317 and 319, respectively, to the data transformers 303. The data transformers 303 and adjacent resistive elements (not shown) isolate, condition, and impedance match the outgoing signals from the channel bank for use at DDS transceivers 305 and 306.

Each DDS transceiver (DDS-1 Transceiver 305 and DDS-2 Transceiver 306) performs selected clock recovery and data formatting operations. As for clock recovery, each DDS transceiver recovers the receive clock (Clk) from the transmitted 4-wire outgoing signal from its respective data transformer for use in the custom integrated circuit chip and other circuit elements via line 325 (or 327). In a preferred embodiment, the clock signal is at a signal rate of 56 kHz. Each DDS transceiver also receives its outgoing data signal from its data transformer via line 329 (or 331) and converts the outgoing signal into a D+ signal and its inversion D− in binary TTL (unipolar) form for use at the custom integrated circuit chip. The D+ and the D− signals also provide certain error monitoring and correction features and the like. As shown, lines 333 and 335 carry the D+ and D− signals, respectively.

The D+ and D− signals from the transceiver with the clock signal enter the custom integrated circuit chip which provides selected data handling and clocking features. The custom integrated circuit chip is typically an application specific integrated circuit (ASIC) such as a gate array, a programmable gate array, or the like. In a specific embodiment, the custom integrated circuit is a Xilinx 3000 Series Programmable Gate Array, but can also be a variety of other integrated circuit chips. Appendix I provides a schematic representation (Copyright, Unpublished Work, Raychem Corporation) for the Xilinx 3000 Series Programmable Gate Array for the DDS COT discussed herein.

The custom integrated circuit chip uses a phase-locked loop (PLL) to synchronize the clock (Clk) with its internal clock. As previously noted, the clock has a signal rate at 56 kHz. The custom integrated circuit divides the 56 kHz clock signal down to a 800 Hz clock signal and then increases the 800 Hz clock signal to provide other selected clock frequencies byway of a two phase PLL configuration. For example, a first PLL inputs the 800 Hz signal and outputs a 512 kHz signal, and a second PLL inputs the 512 KHz signal and outputs a 15.360 MHz signal. The 512 kHz clock and the 15.360 MHz clock enter the ICC integrated circuit chip via line 337. The PLL configuration also provides a clock signal at rate of 64 kHz also for use by the ICC integrated circuit chip.

Besides clocking features, the custom integrated circuit chip uses the 64 kHz clock signal to create two 64 kbps data signal from each D+ and D− signals received from the DDS-1 and the DDS-2 transceivers. The two 64 kbps data signals are multiplexed together with two other 64 kbps signals to provide two user channels and respective control channels defined as a control & information (C & I), and a monitor. The total bit rate of the outgoing signal 365 from the four 64 kbps signals adds to 256 kbps, a corresponding incoming signal 366 also adds to 256 kbps, thereby requiring the use of the 512 kHz clock signal for synchronization.

Over line 339, the outgoing signal is bi-directionally "ping-ponged" at 512 bkps, and enters the ICC integrated circuit chip as two 8-bit words for user data 361, 362, an 8-bit word for control and information (C & I) data 363, and an 8-bit word for monitor signal data 364 via serial interface port (SIP). The ICC converts the stream of data from the custom integrated circuit chip via line 339 into a unidirectional 256 kbps binary TTL signal via line 341. The ICC operates at a clock signal (CLK) at, for example, 512 kHz and a frame control signal (FSC) at, for example, 8 kHz. The CLK and FSC are provided from the custom integrated circuit chip via line 337. Monitor data, ring data, and other data which the microprocessor 312 polls are made available to the microprocessor via lines 361, 363.

The IECQ converts the binary signals from the ICC integrated circuit at 256 kbps via line 341 to a 2B1Q signal at 160 kbps. The 2B1Q signal includes two bits of information stored onto a quaternary word. The IECQ sends its outgoing data via line 343 into the digital subscriber line transformer (DSL Xfmr) 313 which conditions and impedance matches the data signals for transmission over the digital subscriber line 205. The digital subscriber line is a single twisted pair telephone line. The span may be up to 18 kilo-feet on typically mixed 24/26 gauge twisted pair lines without the use of any repeaters or the like. At wire gauges larger than the mixed 24/26 gauge, the span may be up to 33 kilo-feet and even greater.

Incoming signals from the digital subscriber line are processed in a similar but reverse method from the outgoing signals. In particular, a 2B1Q signal enters the DSL transformer 313 via lines 205 which conditions and impedance matches the signal for use in the IECQ integrated circuit chip 311. The 160 kbps 2B1Q signal enters the IECQ integrated circuit chip from the DSL transformer via line 343. The IECQ integrated circuit chip converts the 2B1Q signal into a binary signal at transmission rate of 256 kbps for use in the ICC integrated circuit chip via line 342. The ICC integrated circuit chip converts the 256 kbps signal from the IECQ integrated circuit chip to a 512 kbps signal (as 8-bit words) 366 to the custom integrated circuit chip over line 339. The custom integrated circuit chip then converts the 8-bit words into at least two data signals each in binary TTL format corresponding to two 4-wire DDS signals. Each DDS transceiver receives its binary TTL data (D+ and D− signals) corresponding to its 4-wire DDS signal from the custom integrated circuit chip, and converts the binary TTL data into a selected 4-wire DDS signal. The 4-wire DDS signal exits the DDS transceiver via line 349 (or 351) and enters a data transformer which isolates, conditions, and impedance matches the signal along with adjacent resistive elements (not shown) for use in the channel bank via line 345 (or 347). Accordingly, the incoming 2B1Q signal is converted into a pair of 4-wire DDS signals for use over the channel bank. Appendix II provides a schematic representation of FIG. 3 (Copyright, Unpublished Work, Raychem Corporation) for the DDS COT discussed above.

Figure 4:
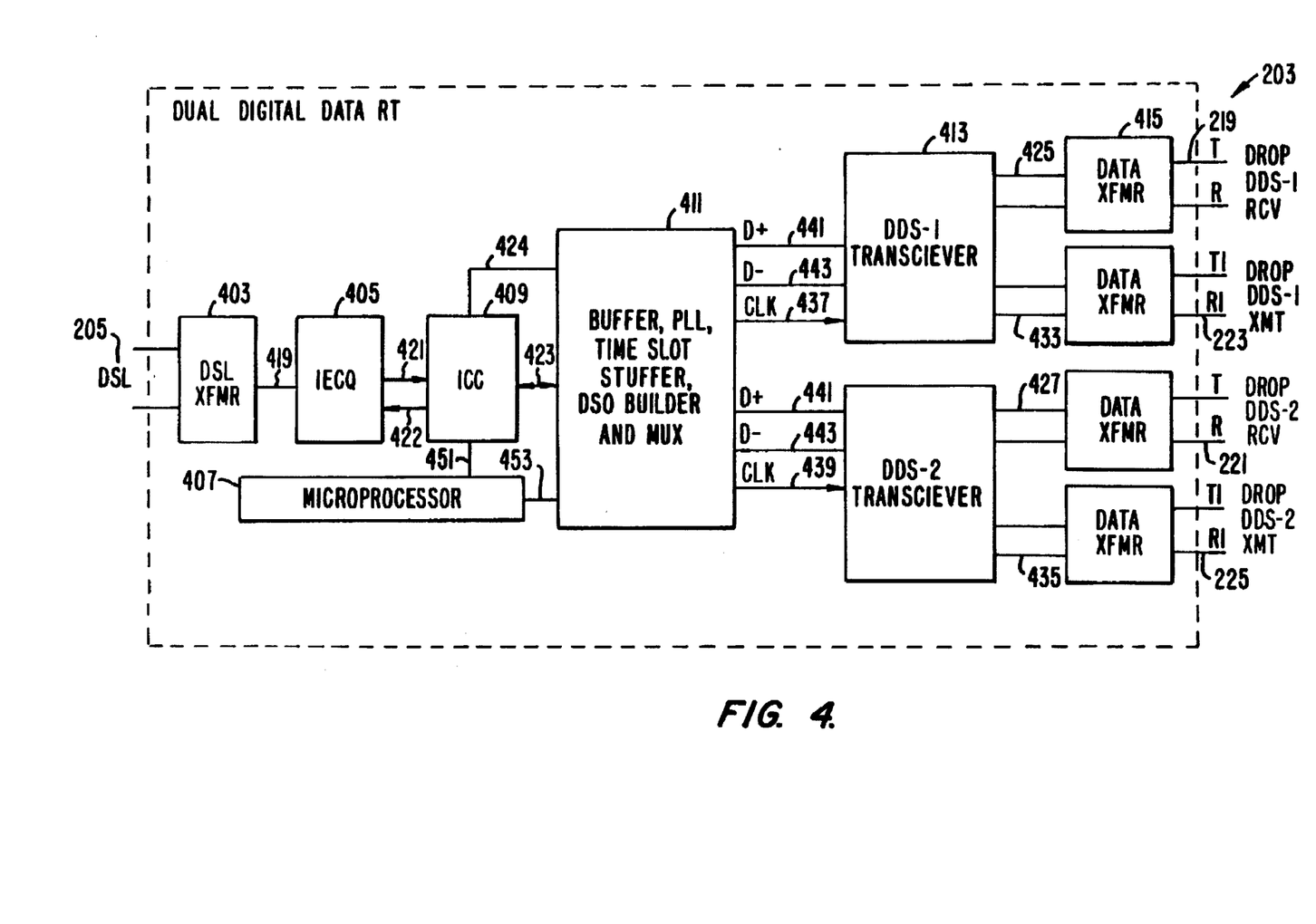
FIG. 4 is a simplified block diagram for a remote terminal according to the present invention.

FIG. 4 illustrates a simplified diagram of a dual digital data service remote terminal (DDS RT) 203 according to the present invention. The DDS RT 203 couples to the digital subscriber line 205, and includes a DSL transformer 403, an IECQ integrated circuit chip 405, a microprocessor 407, an ICC integrated circuit chip 409, a custom integrated circuit chip 411, DDS transceivers 413, data transformers 415, and other elements. The DDS RT is also coupled to two 4-wire digital data service lines 219, 223, 221, and 225.

The DDS RT may be placed at the customer premises, which is often a business or the like using the 4-wire digital data service. The 4-wire digital data service is often used for the transmission of signals such as voice, video, data, and the like. At least two data terminal equipment utilize the signals from the DDS RT and transmit signals for transmission over the digital subscriber line, which is a single twisted pair.

An incoming signal enters the DDS RT from the central office through the digital subscriber line, which is the single twisted pair. The incoming signal is a digital signal using a 2B1Q format and bit rate transmission rate of 160 kbps. The incoming signal from the digital subscriber line enters the digital subscriber line transformer (DSL Xfmr) 403. The DSL transformer and adjacent resistive elements (not shown) isolate, condition, and impedance match the 2B1Q signal from the digital subscriber line for the IECQ integrated circuit chip 405. The incoming signal enters the IECQ integrated circuit chip from the DSL transformer through line 419. The IECQ integrated circuit chip converts the incoming signal at 160 kbps to a binary signal at 256 kbps for transmission through line 421. It should be noted the IECQ integrated circuit chip includes 512 kbps and 8 kbps clock signals which are synchronized to the 160 kbps 2B1Q signals data stream from the digital subscriber line. The binary signal at 256 kbps includes user data and control data. The ICC integrated circuit chip then converts the 256 kbps binary signal to a 512 kbps bi-directional "ping-ponged" bit stream for use with a custom integrated circuit chip via line 423.

The custom integrated circuit chip in the DDS RT operates in a similar manner as the DDS COT. The custom integrated circuit chip includes clocking and data handling features. In the specific embodiment, the custom integrated circuit is a Xilinx 3000 Series Programmable Gate Array, but it will be recognized that other integrated circuit devices may also be used. Appendix III provides a schematic representation (Copyright, Unpublished Work, Raychem Corporation) for the Xilinx 3000 Series Programmable Gate Array for the DDS RT discussed herein.

At the DDS RT, the custom integrated circuit chip phase locks its internal clocks to the incoming 160 kbps signal from the subscriber line, and provides independent sub-rate transmit clocks for the DDS transceivers via lines 443 and 449. The custom integrated circuit also provide clock signals at 64 kbps, 512 kbps, and 15.360 Mbps for use in the ICC integrated circuit chip via line 424, and other integrated circuits. The custom integrated circuit chip relies upon a PLL arrangement and in particular dual PLL arrangement to provide its clocking feature.

Besides clocking features, the custom integrated circuit chip transmits and receives the 512 kbps bi-directional "ping-ponged" data signal to and from the ICC integrated circuit chip, repeatedly and simultaneously. The 8-bit words contained therein are demultiplexed into four 64 kbps signals, representing two user data signals, a control signal, and a monitor signal. The two user data signals each at 64 kbps convert into two user data signals each having a D+ and D− component in binary TTL form.

From the custom integrated circuit chip, the binary D+ and D− user data for each user data signal enters its respective DDS transceiver (DDS-1 and DDS-2) via lines 441. The DDS transceiver converts the binary TTL data into a 4-wire DDS signal at the selected DDS sub-rate. The 4-wire DDS signal enters the data transformer 415 via line 425 (or 427) for impedance matching and conditioning for use at the DSU/CSU via line 219 (or 221). The DSU/CSU converts the 4-wire DDS signal for use at the data terminal equipment. The functionality of the DDS RT is overseen by a microprocessor 407 or the like via lines 451, 453, similar to the DDS COT.

Outgoing signals are processed through the DDS RT in a similar but reverse method from the incoming signals. In particular, dual 4-wire DDS signals originate at DSU/CSUs and enter respective data transformers 415 via lines 223 and 225, respectively. Each data transformer 415 and adjacent resistive elements (not shown) isolate, impedance match, and condition its 4-wire DDS signal for the respective DDS transceiver 413 DDS-1 (or DDS-2) via line 433 (or 435). The DDS transceiver 413 changes the 4-wire DDS signal into a binary TTL signal D+, and its inversion D− for transmission over lines 441 and 443 to the custom integrated circuit chip 411. It should be noted that the outgoing data signals D+ and D− from the DDS transceiver enter the custom integrated circuit chip via clocking signals through line 424. The custom integrated circuit 411 converts two data signals representing the two 4-wire DDS signals from the DDS transceivers to a "ping-ponged" 512 kbps data stream of user data and control data for transmission to the ICC integrated circuit chip 424 over line 423. The ICC integrated circuit chip 424 converts the user data and selected control data from the custom integrated circuit chip 411 to an outgoing unidirectional binary signal at 256 kbps. The outgoing 256 kbps signal from the custom integrated circuit chip enters the IECQ integrated circuit via line 422, which converts the binary signal at 256 kbps into a quaternary signal in a 2B1Q format at a transmission rate of 160 kbps. The 2B1Q formatted outgoing signal from the IECQ integrated circuit chip enters the DSL transformer 403 via line 419. The DSL transformer 403 and adjacent resistive elements (not shown) isolate, impedance match, and condition the outgoing 2B1Q formatted signal for transmission over the digital subscriber line which is a single twisted pair telephone line. The 2B1Q signal is transmitted over the single twisted pair for use at a central office location. Appendix IV provides a schematic representation of FIG. 4 (Copyright, Unpublished Work, Raychem Corporation) for the DDS RT discussed above.

In an alternative specific embodiment, the present DDS COT and DDS RT units may be used for the transmission of video signals for the purpose of video conferencing. The video conferencing occurs in systems that use dual switched 56 kbps facilities for this purpose. Accordingly, the systems may be easily moved from location to location due to the access of single twisted pair telephone lines.

Without in any way limiting the scope of the invention, Table 1 provides a list of commercially available components which are useful in the operation of the DDS RT and DDS COT according to the above embodiments. It will be apparent to those of ordinary skill in the art that the components listed in Table 1 are merely representative of those which may be used in association with the inventions herein and are provided for the purpose of facilitating assembly of an apparatus in accord with the invention. A wide variety of components readily known and available to those of ordinary skill in the art could readily be substituted or functionality could be combined or even separated. It should be noted that CMOS-based integrated circuits have been utilized where possible so as to reduce power consumption of the RT in particular.

TABLE 1

DDS RT and DDS COT Components

| Component | Part Numbers |
|---|---|
| DSL Xfmr | Standard 2B1Q Transformer |
| IECQ | Siemens 2091 |
| ICC | Siemens 2070 |
| Custom Chip | Xilinx 3000 Series |
| Transceiver | Level One LXT 400 |
| Data Xfmr | TMC 5730 or Midcom 671-6390 |
| Microprocessor | Intel 87C51FA |

Present Dual DDS System Software

Appendix V provides a program listing (Copyright, Unpublished Work, Raychem Corporation) for software for the DDS COT discussed above. The code is adapted for and has been used on an Intel 87C51FA processor, although it will be apparent that the invention could be applied to a wide variety of such processor. Appendix VI provides a similar listing (Copyright, Unpublished Work, Raychem Corporation) for the code used for the microprocessor in the DDS RT discussed above. Again, however, a wide variety of microprocessors could be used herein without departing from the scope of the invention.

While the above is a full description of the specific embodiments, various modifications, alternative constructions, and equivalents may be used. For example, while the description above is in terms of converting dual 4-wire DDS for use on a single twisted pair, it would be possible to implement the present invention with a wide variety of other types of systems and the like.

Therefore, the above description and illustrations should not be taken as limiting the scope of the present invention which is defined by the appended claims.

What is claimed is:

1. A method of transferring digital data over a single twisted pair from a first location, said method comprising steps of:

providing a plurality of 4-wire DDS signals from a channel bank at the first location, each of said first plurality of 4-wire DDS signals being a bipolar signal;

combining said plurality of 4-wire DDS signals into a binary signal, and converting said binary signal into a digital signal, said digital signal being selected from a group consisting of a 2B1Q format and a 4B3T format;

transferring said digital signal over said single twisted pair telephone line for use at a second location.

2. The method of claim 1 wherein each of said 4-wire DDS signals includes a signalling rate selected from a group consisting of 2.4 kbps, 4.8 kbps, 9.6 kbps, 19.2 kbps, 56 kbps, and 64 kbps.

3. The method of claim 1 wherein said plurality of 4-wire DDS signals are two 4-wire DDS signals.

4. The method of claim 1 wherein said binary signal is a 256 kbps signal and said digital signal is a 160 kbps signal.

5. The method of claim 1 wherein said plurality of 4-wire DDS signals is from a D4 channel bank.

6. The method of claim 1 wherein said plurality of 4-wire DDS signals is from a SLC-96 channel bank.

7. The method of claim 1 wherein at least one of said plurality of 4-wire DDS signals is selected from a group comprising a video signal, a data signal, and a voice signal.

8. The method of claim 1 wherein said method occurs in a detachable COT unit.

9. The method of claim 1 wherein said single twisted pair is an 18 kilo-feet span using mixed gauge cable.

10. The method of claim 1 further comprising a method of receiving said digital signal from said first location, said receiving method comprising steps:

providing said digital signal over said single twisted pair from telephone company equipment;

converting said digital signal into a binary signal, and separating said binary signal into said plurality of 4-wire DDS signals; and providing at least one of said plurality of 4-wire DDS signals to a data terminal equipment.

11. The method of claim 10 wherein the first location comprises a telephone company location and the second location comprises a customer premises.

12. The method of claim 1 wherein said first location comprises a telephone company location.

13. The method of claim 1 wherein said second location comprises a customer premises.

14. An apparatus for transferring digital data over a single twisted pair from a first location, said apparatus comprising:

a plurality of 4-wire DDS signals sources from a channel bank at the first location, each of said plurality of 4-wire DDS signals being a bipolar signal; and a central office circuit combining said plurality of 4-wire DDS signals into a binary signal, converting said binary signal into a digital signal; and for transferring said digital signal over a single twisted pair telephone line for use at said second location, said digital signal being selected from a group consisting of a 2B1Q format and a 4B3T format.

15. The apparatus of claim 14 further comprising:

a plurality of 4-wire DDS signals sources from a plurality of data terminal equipment, each of said plurality of 4-wire DDS signals being a bipolar signal; and a remote terminal circuit combining said plurality of 4-wire DDS signals into a binary signal, converting said binary signal into a digital signal, and transferring said digital signal over a single twisted pair telephone line for use at a telephone company equipment, said digital signal being selected from a group consisting of a 2B1Q format and a 4B3T format.

16. The apparatus of claim 14 wherein each of said 4-wire DDS signals includes a signalling rate selected from a group consisting of 2.4 kbps, 4.8 kbps, 9.6 kbps, 19.2 kbps, 56 kbps, and 64 kbps.

17. The apparatus of claim 14 wherein said plurality of 4-wire DDS signals are two 4-wire DDS signals.

18. The apparatus of claim 14 wherein said binary signal is a 256 kbps signal and said digital signal is a 160 kbps signal.

19. The apparatus of claim 14 wherein said plurality of 4-wire DDS signals is from a D4 channel bank.

20. The apparatus of claim 14 wherein said plurality of 4-wire DDS signals is from a SLC-96 channel bank.

21. The apparatus of claim 14 wherein at least one of said plurality of 4-wire DDS signals is selected from a group comprising of a video signal, a data signal, and a voice signal.

22. The apparatus of claim 14 wherein said central office circuit is included in a detachable COT unit.

23. The apparatus of claim 14 wherein said single twisted pair is an 18 kilo-feet span of mixed gauge cable.

24. The method of claim 14 wherein said first location comprises a telephone company location.

25. The method of claim 14 wherein said second location comprises a customer premises.

26. The method of claim 14 wherein said first location comprises a telephone company location and said second location comprises a customer premises.

* * * * *